(12) United States Patent
Ngahu et al.

(10) Patent No.: US 10,825,606 B2
(45) Date of Patent: Nov. 3, 2020

(54) POWER TRANSMISSION UNIT

(71) Applicant: Yazaki Corporation, Tokyo (JP)

(72) Inventors: Antony Wambugu Ngahu, Shizuoka (JP); Ryohei Nishizaki, Shizuoka (JP)

(73) Assignee: YAZAKI CORPORATION, Tokyo (JP)

(*) Notice: Subject to any disclaimer, the term of this patent is extended or adjusted under 35 U.S.C. 154(b) by 176 days.

(21) Appl. No.: 16/151,869

(22) Filed: Oct. 4, 2018

(65) Prior Publication Data

US 2019/0108940 A1  Apr. 11, 2019

(30) Foreign Application Priority Data

Oct. 11, 2017 (JP) .................. 2017-197659

(51) Int. Cl.
| | |
|---|---|
| *H01F 27/36* | (2006.01) |
| *H01F 27/02* | (2006.01) |
| *H01F 27/28* | (2006.01) |
| *H02J 50/12* | (2016.01) |
| *H01F 38/14* | (2006.01) |
| *H02J 50/70* | (2016.01) |
| *H02J 50/00* | (2016.01) |
| *H02J 7/02* | (2016.01) |

(52) U.S. Cl.
CPC .............. *H01F 27/36* (2013.01); *H01F 27/02* (2013.01); *H01F 27/28* (2013.01); *H01F 27/2871* (2013.01); *H01F 38/14* (2013.01); *H02J 50/005* (2020.01); *H02J 50/12* (2016.02); *H02J 50/70* (2016.02); *H02J 7/025* (2013.01)

(58) Field of Classification Search
CPC .... H01F 27/365; H01F 27/2871; H01F 38/14; H01F 27/02; H01F 27/28; H02J 50/70; H02J 50/12; H02J 7/025; H02J 2310/48; H02J 50/10; H02J 50/005
USPC .......................................... 307/104; 320/108
See application file for complete search history.

(56) References Cited

U.S. PATENT DOCUMENTS

| 9,325,386 B2 | 4/2016 | Abe et al. |
| 2012/0086394 A1* | 4/2012 | Hui ..................... G05D 1/0038 320/108 |
| 2013/0175877 A1 | 7/2013 | Abe et al. |
| 2015/0077052 A1 | 3/2015 | Hui |
| 2015/0244181 A1 | 8/2015 | Kagami et al. |

FOREIGN PATENT DOCUMENTS

| JP | 2012-161110 A | 8/2012 |
| JP | 2014-113021 A | 6/2014 |

* cited by examiner

*Primary Examiner* — Rexford N Barnie
*Assistant Examiner* — Thai H Tran
(74) *Attorney, Agent, or Firm* — Sughrue Mion, PLLC

(57) ABSTRACT

A power transmission unit includes a power transmission coil, a substrate, and a substrate shielding member. The power transmission coil transmits power to a counterpart power transmission coil in a non-contact manner. The substrate is formed in a plate shape, provided such that the substrate faces the power transmission coil, and electrically coupled to the power transmission coil. A current flows between the substrate and the power transmission coil. The substrate shielding member is formed in a plate shape and provided on a side opposite to a side adjacent to the power transmission coil of the substrate. The substrate shielding member shields a magnetic field.

4 Claims, 12 Drawing Sheets

|  | FIRST EMBODIMENT (DISTANCE 20 mm) | FIRST EMBODIMENT (DISTANCE 15 mm) | SECOND EMBODIMENT (DISTANCE 15 mm) |
|---|---|---|---|
| L [$\mu$H] @PAIR STATE | 3.4745 | 3.4712 | 3.5145 |
| R [m$\Omega$] | 17.342 | 18.201 | 15.347 |
| Q | 125.88 | 119.83 | 143.89 |
| $\kappa$ | 0.61603 | 0.61648 | 0.60793 |
| LOSS IN COIL [W] | 0.068 | 0.068 | 0.066 |
| EDDY CURRENT LOSS [W] | 1.2486 | 1.4884 | 0.87838 |
| LOSS IN WIRES [W] | 1.6157 | 1.6127 | 1.6173 |

FIG.17

|  | COMPARATIVE EXAMPLE | FIRST EMBODIMENT | SECOND EMBODIMENT | THIRD EMBODIMENT |
|---|---|---|---|---|
| L [μH] | 3.4963 | 3.4763 | 3.523 | 3.5164 |
| R [mΩ] | 16.009 | 18.093 | 15.479 | 15.124 |
| Q | 137.22 | 120.72 | 143.00 | 146.09 |
| κ | 0.61 | 0.62 | 0.61 | 0.61 |
| EDDY CURRENT LOSS IN SUBSTRATE SHIELDING MEMBER [W] | - | 0.42 | 0.0003 | 0.0003 |
| H SUBSTRATE LEAKAGE MAGNETIC FIELD [A/m] | 259.79 | 24.913 | 0.798 | 0.653 |

POWER TRANSMISSION UNIT

CROSS-REFERENCE TO RELATED APPLICATION(S)

The present application claims priority to and incorporates by reference the entire contents of Japanese Patent Application No. 2017-197659 filed in Japan on Oct. 11, 2017.

BACKGROUND OF THE INVENTION

1. Field of the Invention

The present invention relates to a power transmission unit.

2. Description of the Related Art

An example of conventional power transmission units is a power supply system disclosed in Japanese Patent Application Laid-open No. 2014-113021. The power supply system supplies power in a non-contact manner. The power supply system includes a power supply side resonance coil that supplies power and a power supply side shield case that shields a leakage magnetic field generated by the power supply side resonance coil.

The power supply system disclosed in Japanese Patent Application Laid-open No. 2014-113021 has room for further improvement to reduce external leakage of a magnetic field generated by a current flowing in a substrate connected to the power supply side resonance coil.

SUMMARY OF THE INVENTION

The invention is made in view of the above problem, and aims to provide a power transmission unit that can reduce external leakage of a magnetic field generated from at least a substrate.

In order to solve the above mentioned problem and achieve the object, a power transmission unit according to one aspect of the present invention includes a power transmission coil that transmits power to a counterpart power transmission coil in a non-contact manner; a substrate that is formed in a plate shape, provided such that the substrate faces the power transmission coil, and electrically coupled to the power transmission coil, a current flowing between the substrate and the power transmission coil; and a first shielding member that is formed in a plate or a film shape, provided on a side opposite to a side adjacent to the power transmission coil of the substrate, and shields a magnetic field.

According to another aspect of the present invention, in the power transmission unit, it is preferable that the power transmission unit includes a magnetic member that is formed in a plate shape, provided between the first shielding member and the substrate, and includes a magnetic material.

According to still another aspect of the present invention, in the power transmission unit, it is preferable that an edge on an extending direction side of the magnetic member along an intersecting direction intersecting a facing direction in which the power transmission coil and the substrate face each other is located more on a central side of the first shielding member than an edge on an extending direction side of the first shielding member along the intersecting direction.

According to still another aspect of the present invention, in the power transmission unit, it is preferable that the first shielding member is formed to have the same size as the substrate.

According to still another aspect of the present invention, in the power transmission unit, it is preferable that the power transmission unit includes a second shielding member that is formed in an annular shape around an axial line and has a shield wall shielding a magnetic field generated by the power transmission coil provided inside the second shielding member, wherein the shield wall is formed such that a distance between wall surfaces facing each other in an intersecting direction intersecting the axial line increases toward the counterpart power transmission coil.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 17 is a diagram illustrating results of simulation of power transmission efficiencies of the power transmission units in the first, the second, and the third embodiments.

DETAILED DESCRIPTION OF THE
PREFERRED EMBODIMENTS

The following describes embodiments of the invention in detail with reference to the accompanying drawings. The contents described in the following embodiments do not limit the invention. The constituent elements described below include elements easily envisaged by those skilled in the art and identical elements. In addition, the structures described below can be combined as appropriate. The structures can be omitted, replaced, or modified in various ways without departing from the scope of the invention.

First Embodiment

The following describes a power transmission unit 1 according to a first embodiment. The power transmission unit 1 transmits power in a non-contact manner and transmits a signal via wireless communication. The power transmission unit 1 functions as a power transmission side that transmits power and a power receiving side that receives power. The power transmission unit 1 is used for charging a battery provided on a vehicle, which is not illustrated, for example. In this case, the power transmission unit 1 on the power receiving side is installed on a bottom surface of the vehicle, for example, and coupled to the battery of the vehicle. The power transmission unit 1 on the power transmission side is installed on the ground surface of a charging station, which is not illustrated, for example, and coupled to a power source. The power transmission unit 1 on the power transmission side transmits power supplied from the power source to the power transmission unit 1 on the power receiving side by magnetic resonance, for example, in a state where the power transmission unit 1 on the power transmission side faces the power transmission unit 1 on the power receiving side. The power transmission unit 1 on the power receiving side receives the power transmitted from the power transmission unit 1 on the power transmission side and outputs the received power to the battery of the vehicle. In the following description, the power transmission unit 1 is described without discriminating whether the power transmission unit 1 is on the power transmission side or the power receiving side unless otherwise specified because the major structures of the power transmission units 1 on the power transmission side and the power receiving side are the same.

Figure 1:
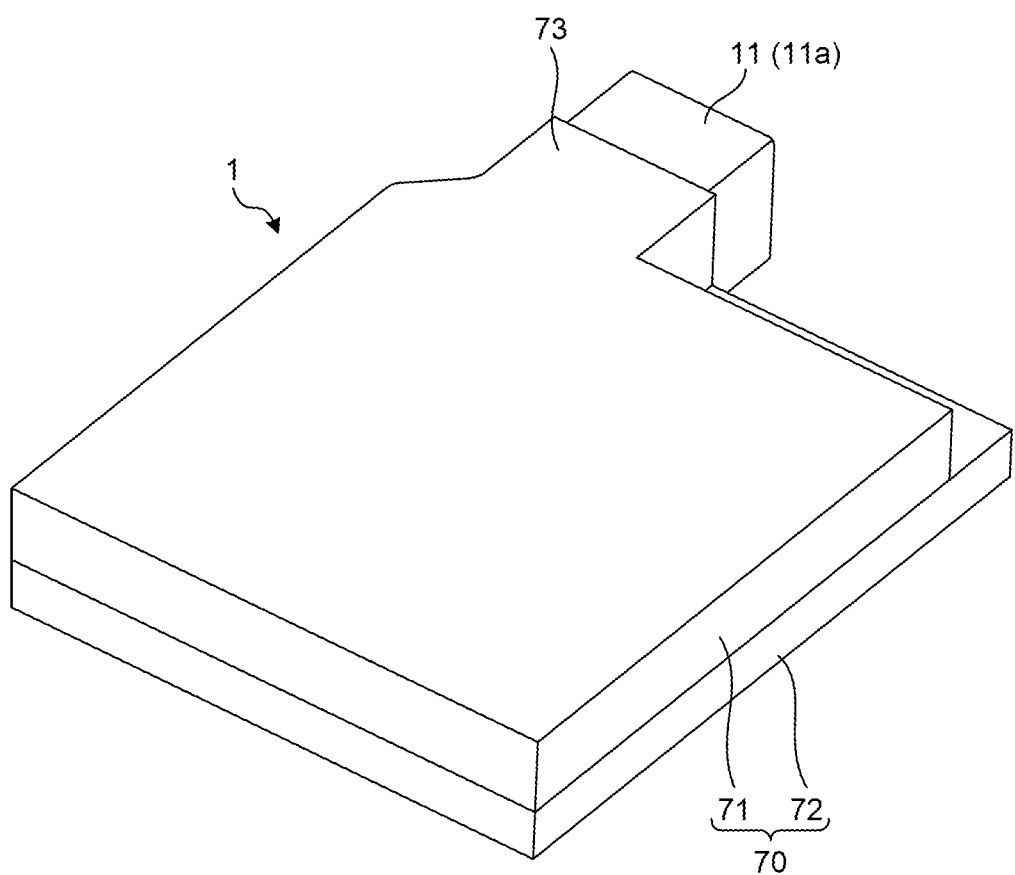
FIG. 1 is a perspective view illustrating an exemplary structure of a power transmission unit according to a first embodiment.
Figure 2:
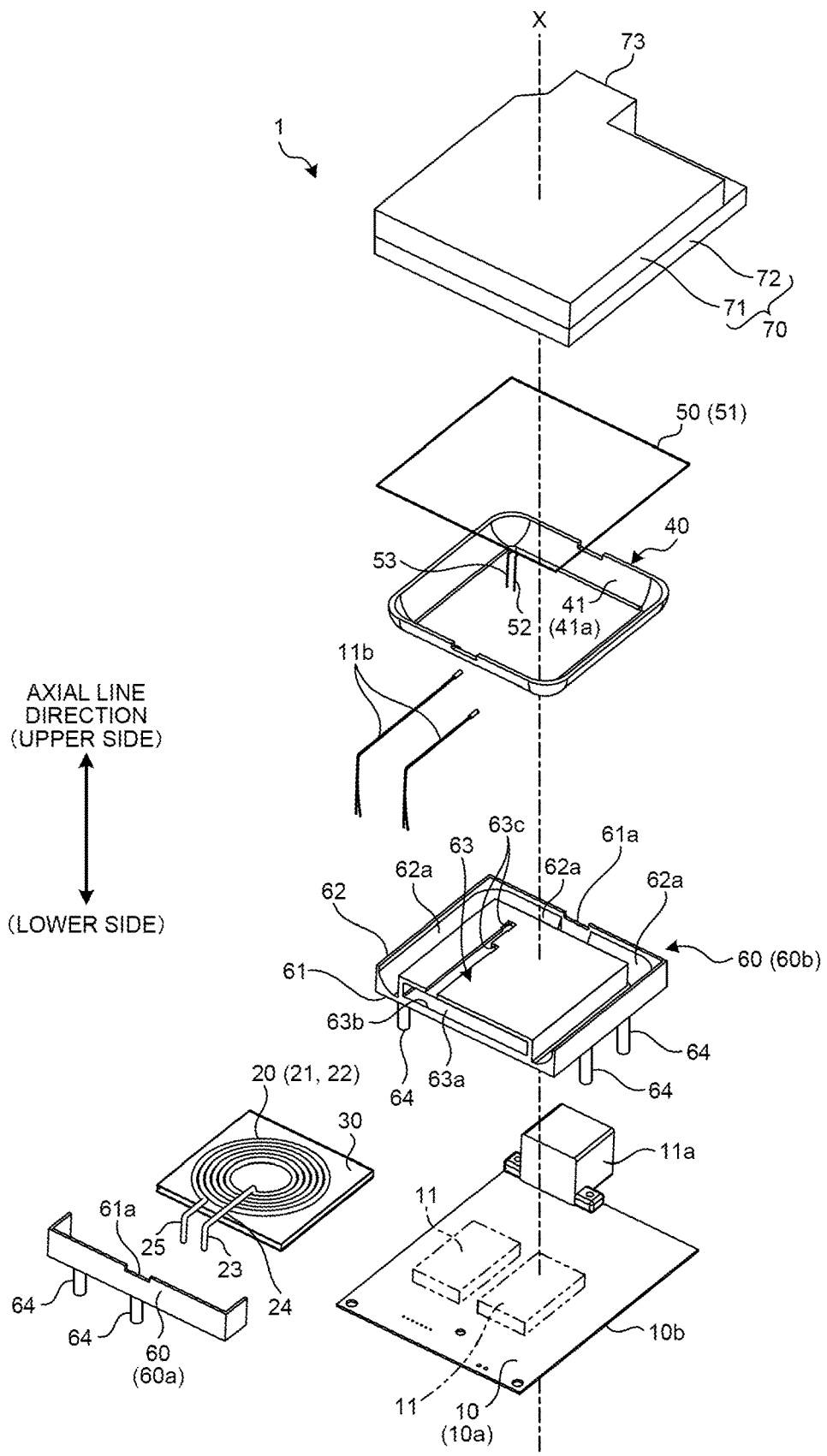
FIG. 2 is an exploded perspective view illustrating the exemplary structure of the power transmission unit in the first embodiment.
Figure 3:
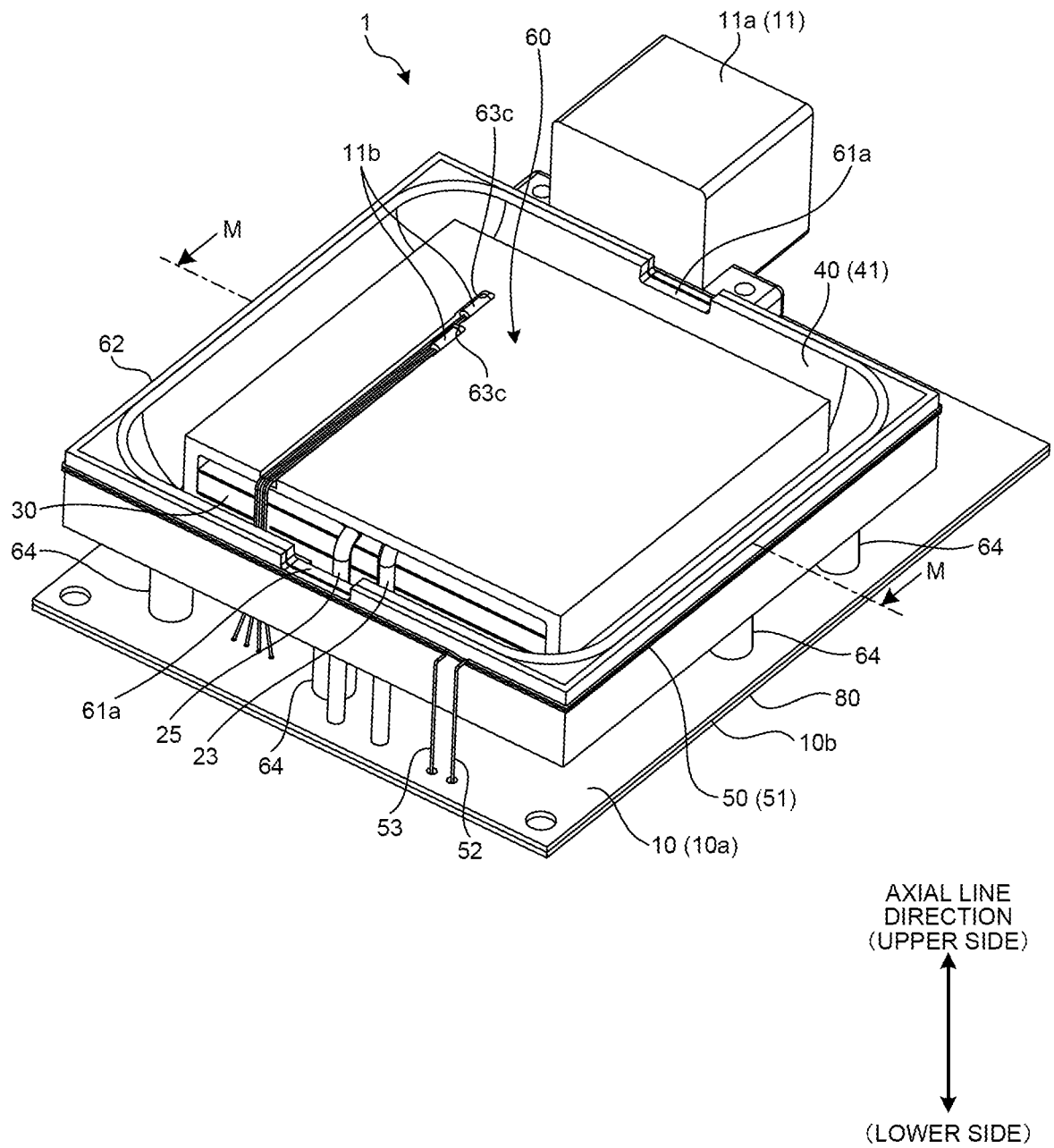
FIG. 3 is a perspective view illustrating the exemplary structure of the power transmission unit in the first embodiment in a state where an outer case is removed.
Figure 4:
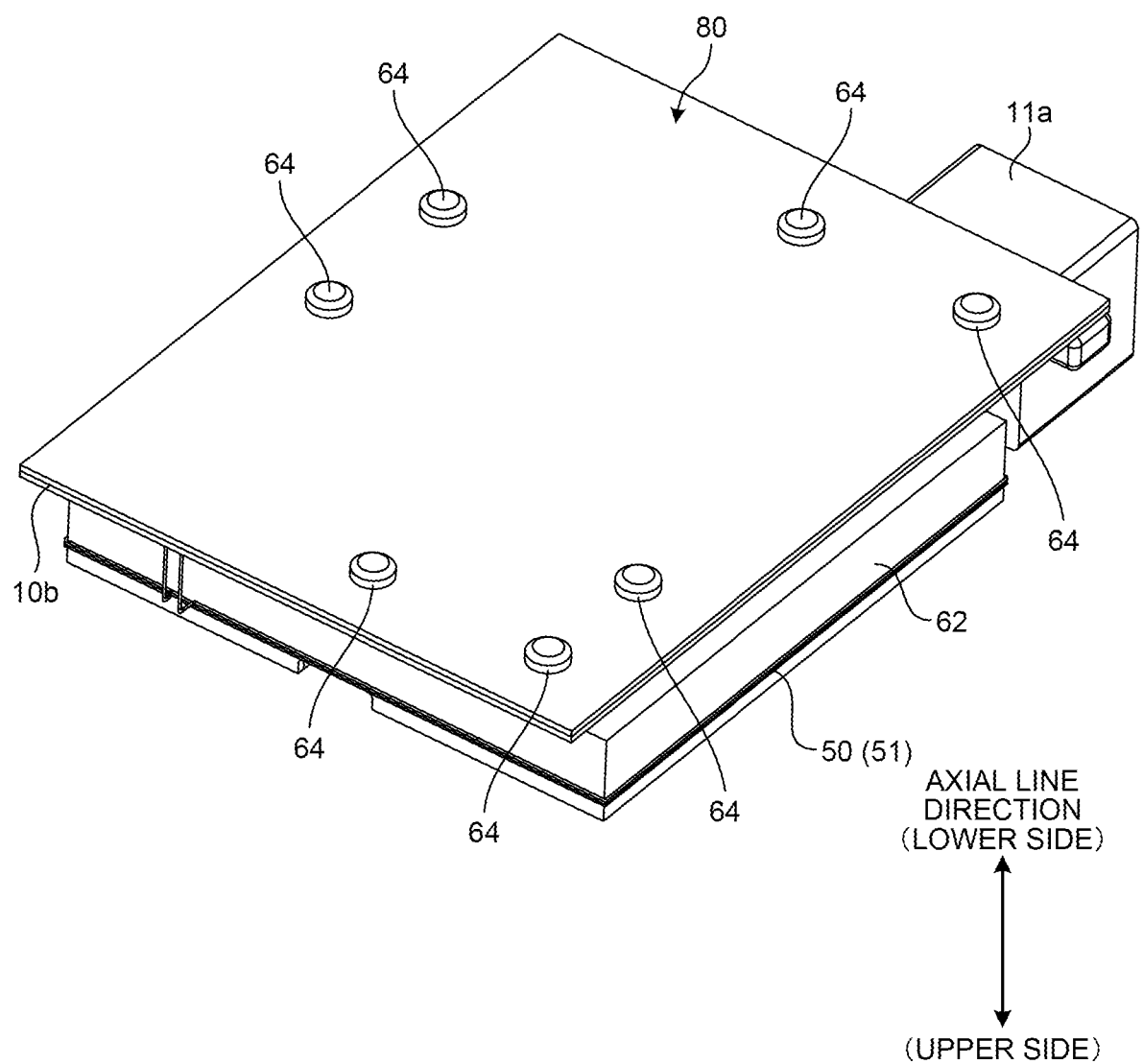
FIG. 4 is a perspective view illustrating the exemplary structure of the power transmission unit in the first embodiment when viewed from a rear surface side of the power transmission unit.

As illustrated in FIGS. 1, 2, and 3, the power transmission unit 1 includes a substrate 10, a power transmission coil 20, a ferrite 30, a coil shielding member 40 serving as the second shielding member, a communication coupler 50 serving as a communication unit, an inner case 60 serving as an inner member, an outer case 70 serving as an outer member, and a substrate shielding member 80 serving as the first shielding member.

An axial line direction is a direction along an axial line X. An upper side in the axial line direction is a side adjacent to the power transmission coil 20 while a lower side in the axial line direction is a side adjacent to the substrate 10. The axial line direction is also described as a facing direction. An intersecting direction is a direction intersecting the axial line direction. An orthogonal direction is a direction orthogonal to the axial line direction.

On the substrate 10, an electronic circuit is formed. The substrate 10 is what is called a printed circuit board. The substrate 10 has an insulation layer made of an insulation material such as an epoxy resin, a glass epoxy resin, a paper-epoxy resin composite, or a ceramic, for example. On the insulation layer, a wiring pattern (printed pattern) is formed by a conductive member such as a copper foil. The substrate 10 is formed in a rectangular plate shape, for example. The substrate 10 has a mounting surface 10a on which various electronic components 11 including a resonance capacitor are mounted and a rear surface 10b opposite to the mounting surface 10a. On the substrate 10, the various types of electronic components 11 mounted on the mounting surface 10a are electrically coupled with the wiring pattern. The substrate 10 is provided in such a manner that the substrate 10 faces the power transmission coil 20 in the axial line direction. The substrate 10 is electrically coupled to the power transmission coil 20. A high frequency current flows between the substrate 10 and the power transmission coil 20.

The power transmission coil 20 transmits power to a counterpart power transmission coil 20A on the other side (i.e., the power receiving side) in a non-contact manner. The power transmission coil 20 forms an LC resonance circuit together with the resonance capacitor. The power transmission coil 20 is coupled in series to the resonance capacitor, for example. The power transmission coil 20 includes a coil winding portion 22, a winding start edge portion 23, an intermediate portion 24, and a winding end edge portion 25, for example. In the coil winding portion 22, a conductive wire 21 is provided spirally around the axial line X. The winding start edge portion 23 is located on a side where winding of the conductive wire 21 starts. The winding end edge portion 25 is located on a side where winding of the conductive wire 21 ends. The intermediate portion 24 is between the coil winding start edge portion 23 and the coil winding portion 22. The conductive wire 21 is Litz wire in which a plurality of conductive element wires are twisted together, for example. In the coil winding portion 22, the conductive wire 21 is formed in a spiral shape by being wound around in a plurality of turns from an inside toward the outside of the power transmission coil 20 along the intersecting direction intersecting the axial line direction. In the coil winding portion 22, the conductive wire 21 is most often wound around in a plurality of turns from the inside toward the outside along the orthogonal direction orthogonal to the axial line direction. In the intermediate portion 24, the conductive wire 21 is extended across the coil winding portion 22 from the inside to the outside of the coil winding portion 22. The intermediate portion 24 is compressed along the axial line direction and fixed to the coil winding portion 22 with an adhesive member, for example. The winding start edge portion 23 and the winding end edge portion 25 are located outside the coil winding portion 22 when viewed from the axial line direction. The winding start edge portion 23 and the winding end edge portion 25 are electrically coupled to the substrate 10.

The ferrite 30 is a member including a magnetic material. The ferrite 30 is a composite oxide of iron oxide and metal, for example. The ferrite 30 is formed in a rectangular shape having a similar size to the power transmission coil 20, for example. The ferrite 30 is provided in such a manner that the ferrite 30 faces the power transmission coil 20 in the axial line direction. The ferrite 30 allows magnetic force generated by the power transmission coil 20 to pass through the ferrite 30 to reduce a loss of magnetic force.

Figure 5:
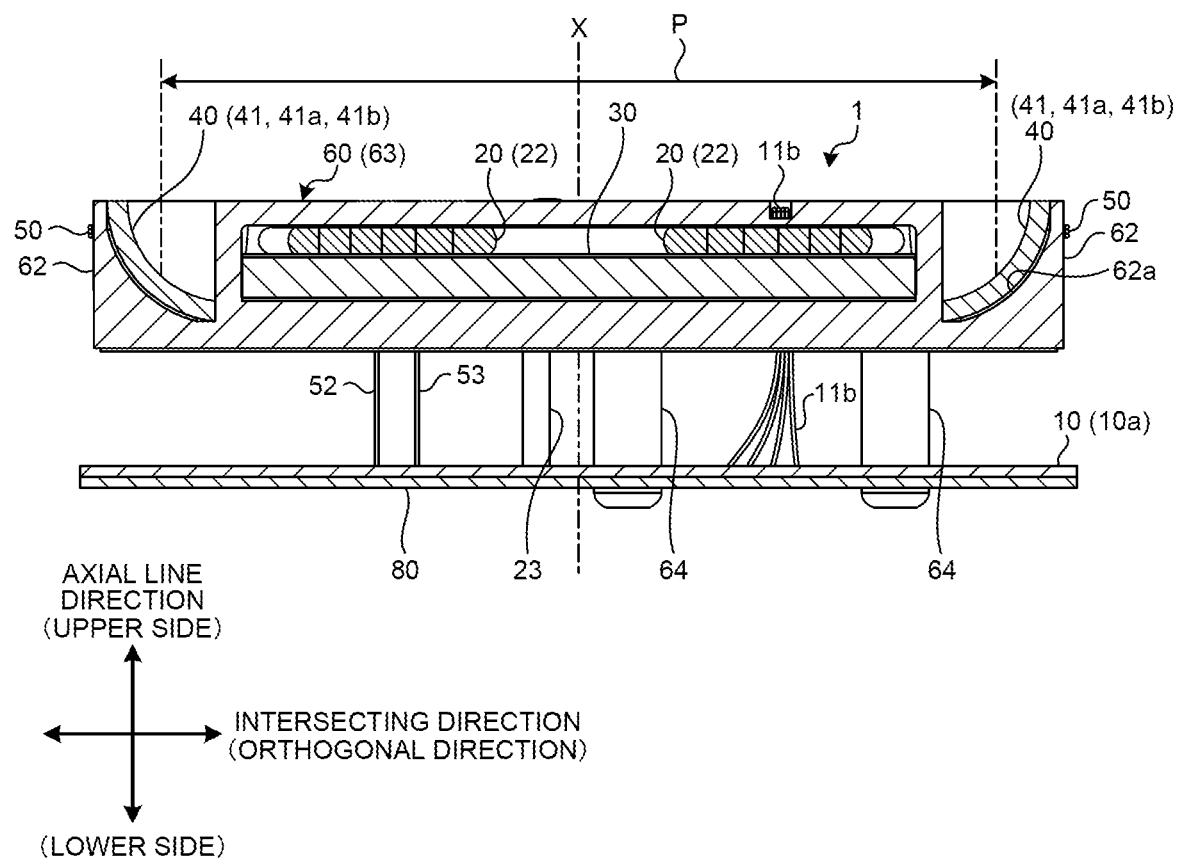
FIG. 5 is a cross-sectional view taken along M-M in FIG. 3 illustrating the power transmission unit in the first embodiment.

The coil shielding member 40 shields extra magnetic force (a leakage magnetic field), which causes a noise, for example, of the power transmission coil 20. The coil shielding member 40 is made of metal having high conductivity such as copper or aluminum, for example. The coil shielding member 40 includes a shield wall 41 formed in an annular shape around the axial line X and opens both sides in the axial line direction. The shield wall 41 is formed by winding a long plate member around the axial line X one turn, for example. The forming method is not limited to this example. The shield wall 41 is formed in a substantially rectangular shape when viewed from the axial line direction and has rounded four corners. As illustrated in FIGS. 3 and 5, for example, the shield wall 41 is provided at such a position along the intersecting direction that the shield wall 41 surrounds the power transmission coil 20 and the ferrite 30. The shield wall 41 is provided such that the shield wall 41 is located outside the power transmission coil 20 and the ferrite 30 to surround the power transmission coil 20 and the ferrite 30, and overlaps with the power transmission coil 20 and the ferrite 30 when viewed from the intersecting direction.

Figure 6:
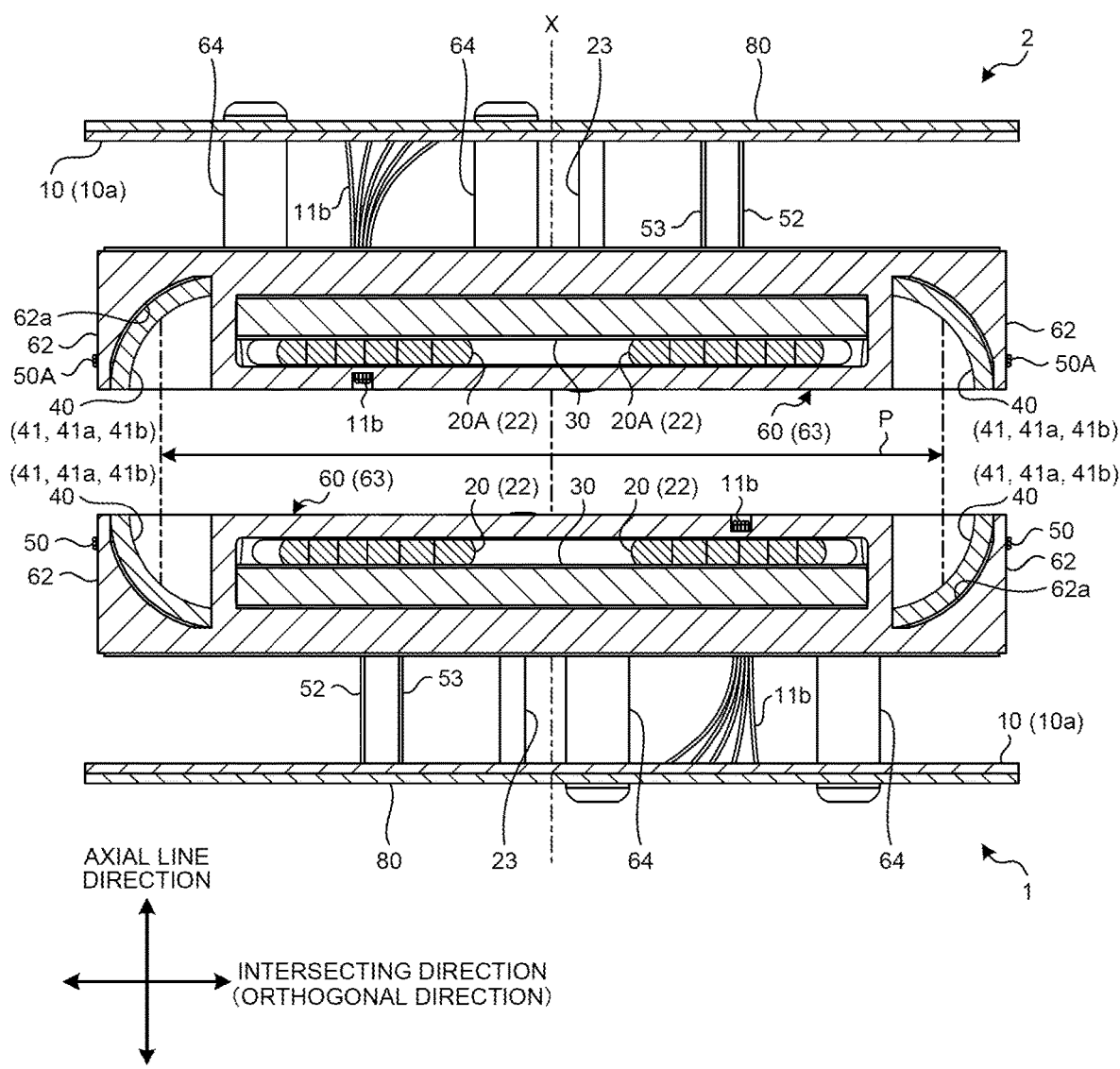
FIG. 6 is a cross-sectional view illustrating the power transmission unit on a power supply side and the power transmission unit on a power receiving side in the first embodiment.

The shield wall 41 is formed in such a shape that the shield wall 41 fans out toward the counterpart power transmission coil 20A on the power receiving side. Specifically, the shield wall 41 is formed such that a distance P between wall surfaces 41a facing with each other in the intersecting direction is widened from one side (lower side) to the other side (upper side) in the axial line direction (refer to FIGS. 5 and 6). This shape makes it possible to prevent lines of magnetic force (lines of magnetic flux) of the power transmission coil 20 and the shield wall 41 from being mutually orthogonal. The shield wall 41 can thus prevent an eddy current from flowing therein, the eddy current generating a magnetic field canceling a change in magnetic field caused by the power transmission coil 20, thereby making it possible to prevent reduction in power transmission efficiency. A cut portion 41b, which is a cross section cut along the axial line direction, of the shield wall 41 is formed in an arc shape curved on the outside of the shield wall 41. This shape can further prevent the eddy current from flowing therein.

The communication coupler 50 is an antenna for sending and receiving a signal. The communication coupler 50 is formed in an annular shape around the axial line X. The communication coupler 50 is formed by spirally winding an antenna wire 51 around the axial line X a plurality of turns (e.g., three turns), for example. The communication coupler 50 has a first edge portion 52 located on a side where winding of the antenna wire 51 starts and a second edge portion 53 located on a side where winding of the antenna wire 51 ends. The first edge portion 52 and the second edge portion 53 are electrically coupled to the substrate 10. The communication coupler 50 is formed in a substantially rectangular shape when viewed from the axial line direction. The communication coupler 50 is provided at such a position along the intersecting direction that the communication coupler 50 surrounds the power transmission coil 20. The communication coupler 50 is located outside the power transmission coil 20 such that the communication coupler 50 surrounds the power transmission coil 20. Between the communication coupler 50 and the power transmission coil 20 in the intersecting direction, the coil shielding member 40 is provided. This structure makes it possible for the coil shielding member 40 to prevent magnetic force of the power transmission coil 20 from influencing the communication coupler 50. The communication coupler 50 thus can prevent characteristics from being changed and a loss of a signal, thereby making it possible to prevent deterioration in communication quality.

The inner case 60 is housed in the outer case 70. The inner case 60 is formed of an insulation synthetic resin, for example, by known injection molding, for example. The inner case 60 defines the relative positions among the substrate 10, the power transmission coil 20, and the ferrite 30 so as to enable power transmission to the counterpart power transmission coil 20A on the power receiving side. Furthermore, the inner case 60 defines the relative position between the coil shielding member 40 and the communication coupler 50 so as to enable communication with a communication coupler 50A on the power receiving side. To the inner case 60, the substrate 10, the power transmission coil 20, the ferrite 30, the coil shielding member 40, and the communication coupler 50 are assembled. This assembly makes it possible for the power transmission unit 1 to house the inner case 60 in the outer case 70 while the constituent components including the substrate 10, the power transmission coil 20, the ferrite 30, the coil shielding member 40, and the communication coupler 50 are positioned and assembled to the inner case 60. As a result, the power transmission unit 1 can more easily and correctly define the relative positions among the constituent components and easily hold the constituent components than a case where the constituent components are assembled directly inside the outer case 70. The power transmission unit 1 can thus correctly define the relative positions with respect to the constituent components of a power transmission unit 2 on the power receiving side.

The inner case 60 includes a supporting plate 61, a vertical wall 62, a housing room 63, and a plurality of coupling members 64. The supporting plate 61 is provided such that the supporting plate 61 intersects the axial line X. The vertical wall 62 stands from the supporting plate 61 and is provided in an annular shape around the axial line X. The vertical wall 62 is formed in a substantially rectangular shape when viewed from the axial line direction. The outer circumference of the vertical wall 62 has the same shape as the inner circumference of the communication coupler 50. The communication coupler 50 is placed on the vertical wall 62 by being wounded around the outer circumferential surface of the vertical wall 62, for example. The inner circumference of the vertical wall 62 has the same shape as the outer circumference of the coil shielding member 40. The vertical wall 62 has, on the inside thereof, a supporting portion 62a that has a curved shape and supports the outer surface of the coil shielding member 40. The coil shielding member 40 is placed on the vertical wall 62 by being supported by the supporting portion 62a. The coil shielding member 40 is placed on the vertical wall 62 by being adhesively bonded on the supporting portion 62a with an adhesive tape (not illustrated), for example. The vertical wall 62 is provided with a notch 61a at an upper end portion thereof in the axial line direction. The notch 61a is formed by cutting a part of the upper end portion of the vertical wall 62 in the axial line direction. The notch 61a allows a potting material or a molding material to easily flow into the inside of the inner case 60.

The housing room 63 is formed in a rectangular parallelepiped shape and provided inside the vertical wall 62. The housing room 63 includes an air space 63a, an insertion inlet 63b, and an attachment portion 63c. The air space 63a houses the power transmission coil 20. The insertion inlet 63b allows the power transmission coil 20 to be inserted into the air space 63a. To the attachment portion 63c, a thermistor 11*b* is attached that measures a temperature of the power transmission coil 20 and detects a foreign material (e.g., a metallic foreign material) present between the outer case 70 and the inner case 60. The power transmission coil 20 is inserted into the air space 63*a* from the insertion inlet 63*b* and housed in the air space 63*a* of the housing room 63. The thermistor 11*b*, which measures a temperature of the power transmission coil 20 housed in the air space 63*a* and detects a foreign material present between the outer case 70 and the inner case 60, is attached to the attachment portion 63*c* of the housing room 63. The inner case 60 is configured to be capable of separating a portion 60*a*, which is a part of the inner case 60 on the insertion inlet 63*b* side, from a main body 60*b* so as to allow the power transmission coil 20 to be inserted into the air space 63*a* from the insertion inlet 63*b*.

The coupling members 64 each have a rod-like shape and connect the inner case 60 and the substrate 10. The coupling members 64 each extend from under the inner case 60 in the axial line direction to a side adjacent to the substrate 10 along the axial line direction. The edge portions on the substrate 10 side of the respective coupling members 64 are fixed to the substrate 10. As a result, the coupling members 64 connect the inner case 60 and the substrate 10 with a certain distance therebetween. Each coupling member 64 is provided with a screw hole at the edge on the substrate 10 side thereof, for example. Into the screw hole of each coupling member 64, a bolt is fastened, resulting in the substrate 10 being sandwiched between the edge on the substrate 10 side of the coupling member 64 and the bolt. As a result, the coupling members 64 connect the inner case 60 and the substrate 10. The method for connecting the inner case 60 and the substrate 10 is not limited to the method described above.

The outer case 70 is a housing that covers the inner case 60. The outer case 70 is formed of an insulation synthetic resin, for example, by known injection molding, for example. The outer case 70 includes an upper case 71 provided on the upper side in the axial line direction and a lower case 72 provided on the lower side in the axial line direction. The outer case 70 is formed in a box shape by assembling the upper case 71 and the lower case 72 in the axial line direction. The outer case 70 is provided with a connector opening 73 in which a connector connection portion 11*a* provided to the substrate 10 is exposed. The upper case 71 and the lower case 72 that are included in the outer case 70 cover the whole of the inner case 60 to which the substrate 10, the power transmission coil 20, the ferrite 30, the coil shielding member 40, and the communication coupler 50 are assembled.

The substrate shielding member 80 is a metallic plate that shields a leakage magnetic field (hereinafter, also described as a substrate leakage magnetic field) generated by a high frequency current flowing in the substrate 10 and wiring lines connected to the substrate 10. The substrate shielding member 80 is formed of metal having high conductivity such as copper or aluminum, for example. The substrate shielding member 80 is formed in a rectangular shape having the same size as the substrate 10, for example. The substrate shielding member 80 is provided on the side opposite to the side adjacent to the power transmission coil 20 of the substrate 10, i.e., on the rear surface 10*b* of the substrate 10. The substrate shielding member 80 is assembled on the substrate 10 by being abutted on the rear surface 10*b*. In a state where the substrate shielding member 80 is overlapped on the rear surface 10*b* of the substrate 10, the bolt is fastened into the screw hole for each coupling member 64, for example. As a result of the fastening, the substrate shielding member 80 and the substrate 10 are sandwiched between the edges on the substrate 10 side of the respective coupling members 64 and the corresponding respective bolts. The substrate shielding member 80 is thus assembled on the substrate 10 by being abutted on the rear surface 10*b* of the substrate 10. This structure, in which the substrate shielding member 80 and the substrate 10 are connected by being abutted on each other, makes it possible to relatively reduce a length of the power transmission unit 1 in the axial line direction. As a result, it is possible to prevent an increase in size of the power transmission unit 1. The substrate shielding member 80 may be assembled by being spaced apart from the rear surface 10*b* of the substrate 10, i.e., assembled with an air layer interposed between itself and the rear surface 10*b*. This structure relatively increases the length of the power transmission unit 1 in the axial line direction due to the substrate shielding member 80 thus assembled. The air layer in this structure, however, can prevent the occurrence of the eddy current.

As described above, the power transmission unit 1 in the first embodiment includes the power transmission coil 20, the substrate 10, and the substrate shielding member 80. The power transmission coil 20 transmits power to the counterpart power transmission coil 20A on the power receiving side in the non-contact manner. The substrate 10 is formed in a plate shape and provided such that the substrate 10 faces the power transmission coil 20. The substrate 10 is electrically coupled to the power transmission coil 20. A high frequency current flows between the substrate 10 and the power transmission coil 20. The substrate shielding member 80 is formed in a plate shape and provided on the side opposite to the side adjacent to the power transmission coil 20 of the substrate 10. The substrate shielding member 80 shields the magnetic field.

Figure 7:
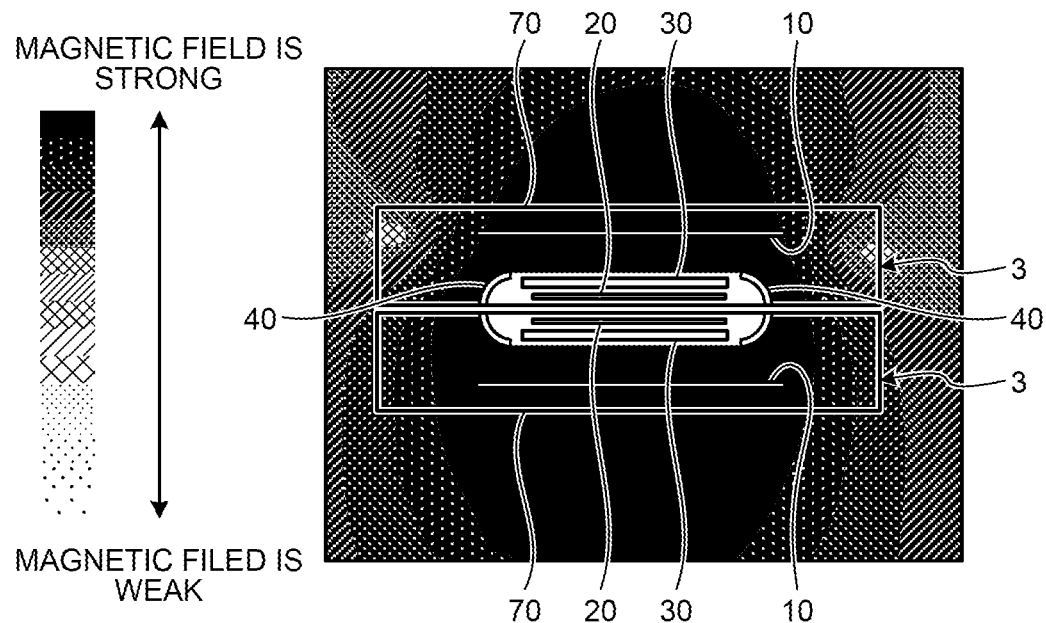
FIG. 7 is a diagram illustrating a magnetic field of the power transmission unit according to a comparative example.
Figure 8:
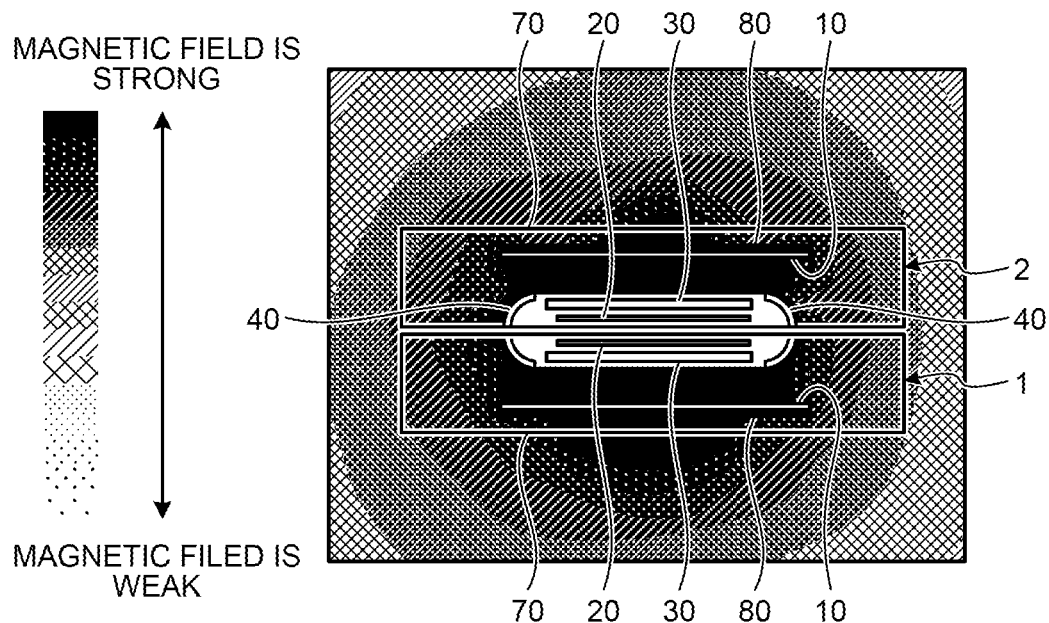
FIG. 8 is a diagram illustrating a magnetic field of the power transmission unit in the first embodiment.

The substrate shielding member 80 of the power transmission unit 1 in this structure can shield the substrate leakage magnetic field generated by the high frequency current flowing in the substrate 10 and the wiring lines connected to the substrate 10. This shielding makes it possible for the power transmission unit 1 to reduce the substrate leakage magnetic field distributed outside the outer case 70 of the power transmission unit 1. The power transmission unit 1 thus can prevent external electronic apparatuses and metallic parts from being influenced by the substrate leakage magnetic field. FIG. 7 is a diagram illustrating a magnetic field of a power transmission unit 3 according to a comparative example and illustrating a distribution of the magnetic field, for example. The power transmission unit 3 in the comparative example has the same structure as the power transmission unit 1 in the first embodiment except for that the power transmission unit 3 does not include the substrate shielding member 80. As illustrated in FIG. 7, the substrate leakage magnetic field of the power transmission unit 3 in the comparative example is distributed widely outside the outer case 70. In contrast, as illustrated in FIG. 8, the power transmission unit 1 and the power transmission unit 2 on the power receiving side in the first embodiment can each further reduce the substrate leakage magnetic field distributed outside the outer case 70 than that of the power transmission unit 3 because the power transmission units 1 and 2 each include the substrate shielding member 80.

In the power transmission unit 1, the substrate shielding member 80 is formed to have the same size as the substrate 10. This structure makes it possible for the power transmission unit 1 to effectively reduce the substrate leakage magnetic field distributed outside the outer case 70.

The power transmission unit 1 includes the coil shielding member 40 having the shield wall 41 that is formed in an annular shape around the axial line X and shields the magnetic field generated by the power transmission coil 20 provided inside thereof. The shield wall 41 is formed such that the distance P between the wall surfaces 41a facing with each other in the intersecting direction intersecting the axial line X is widened toward the counterpart power transmission coil 20A on the power receiving side. This structure makes it possible for the coil shielding member 40 to prevent lines of magnetic force of the power transmission coil 20 and the wall surface 41a of the shield wall 41 from being mutually orthogonal. The coil shielding member 40 thus can prevent the occurrence of the eddy current, thereby preventing the reduction in power transmission efficiency. As described above, the coil shielding member 40 can prevent the reduction in power transmission efficiency by a simple structure without additional other components. The coil shielding member 40 can also prevent heat generation in the coil shielding member 40.

Second Embodiment

Figure 9:
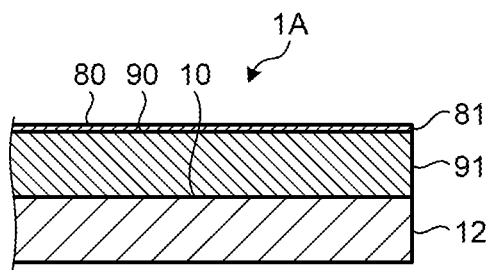
FIG. 9 is a cross-sectional view illustrating an exemplary structure of a major part of the power transmission unit according to a second embodiment.

The following describes a power transmission unit 1A and a power transmission unit 2A on the other side according to a second embodiment. The power transmission units 1A and 2A have the same structure. The description of the power transmission unit 2A on the other side is thus omitted. In the second embodiment, the constituent elements having the same structures as those in the first embodiment have the same numerals as those in the first embodiment. The detailed descriptions thereof are thus omitted. The power transmission unit 1A differs from the power transmission unit 1 in the first embodiment in that the power transmission unit 2A includes a magnetic member 90. As illustrated in FIG. 9, the magnetic member 90 is provided between the substrate shielding member 80 and the substrate 10 in the power transmission unit 1A. The magnetic member 90 includes a magnetic material. The magnetic member 90 is a composite oxide of iron oxide and metal, for example. The magnetic member 90 is formed in a rectangular plate shape having the same size as the substrate shielding member 80, for example. The magnetic member 90 is sandwiched between the substrate shielding member 80 and the substrate 10 in the axial line direction. The substrate shielding member 80, the magnetic member 90, and the substrate 10 are layered in the same direction. In the state where the substrate shielding member 80, the magnetic member 90, and the substrate 10 are layered, they form a rectangular flat plate shape. The respective edges of the substrate shielding member 80, the magnetic member 90, and the substrate 10 are aligned when viewed from the axial line direction. The substrate shielding member 80, the magnetic member 90, and the substrate 10 are layered in a state where an edge 81 of the substrate shielding member 80 in the intersecting direction, an edge 91 of the magnetic member 90 in the intersecting direction, and an edge 12 of the substrate 10 in the intersecting direction are aligned when viewed from the axial line direction.

The magnetic member 90 is assembled by being layered in a state where the magnetic member 90 abuts the substrate shielding member 80 and the substrate 10, for example. In the state where the magnetic member 90 is sandwiched between the substrate shielding member 80 and the substrate 10, a bolt is fastened into the screw hole of each coupling member 64. As a result of the fastening, the substrate shielding member 80, the magnetic member 90, and the substrate 10 are sandwiched between the edges on the substrate 10 side of the respective coupling members 64 and the corresponding respective bolts. The magnetic member 90 is thus assembled in the state where the magnetic member 90 is sandwiched between the substrate shielding member 80 and the substrate 10.

Figure 10:
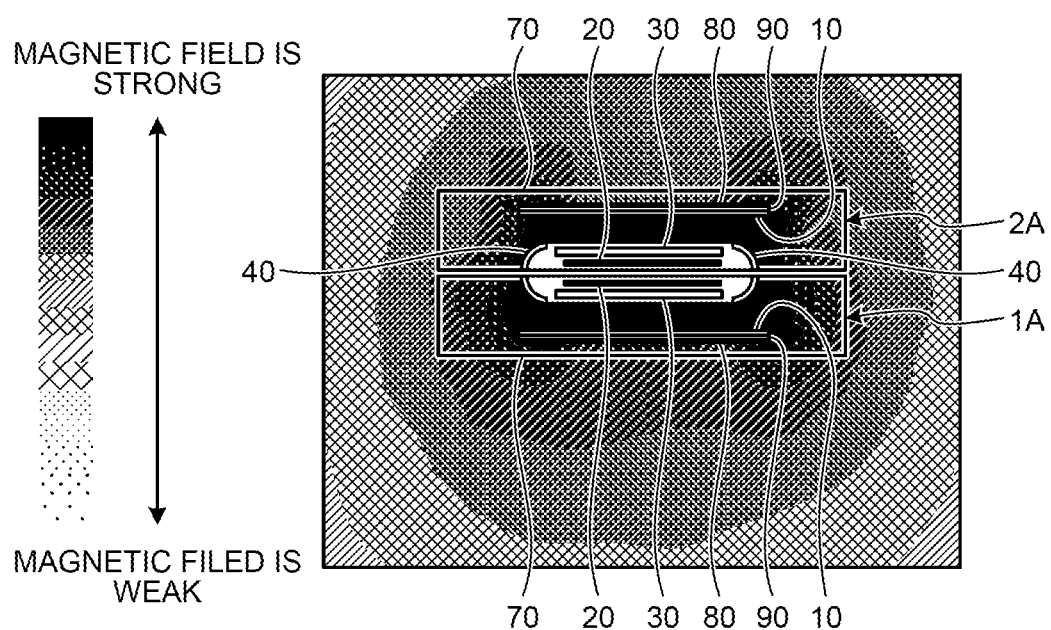
FIG. 10 is a diagram illustrating a magnetic field of the power transmission unit in the second embodiment.
Figure 11:
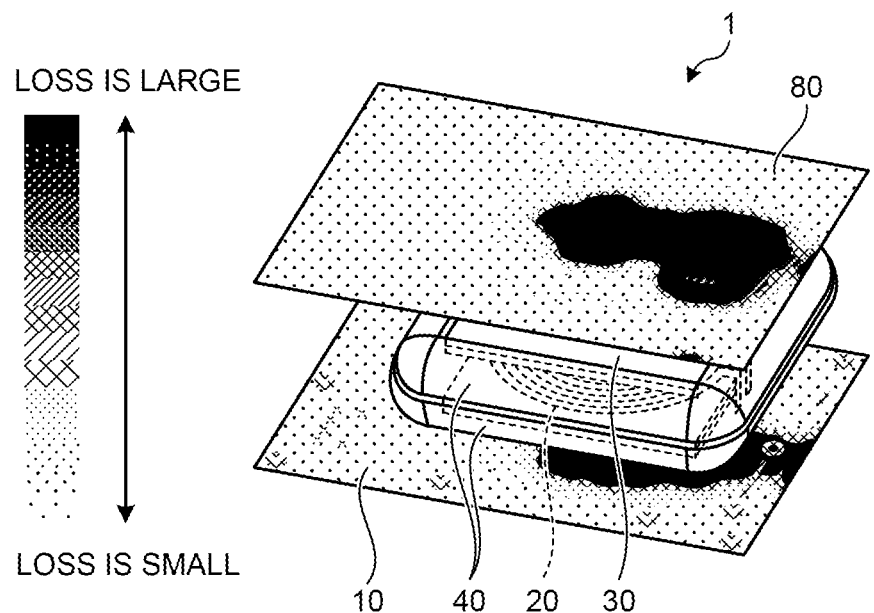
FIG. 11 is a diagram illustrating an eddy current loss in the power transmission unit in the first embodiment serving as a comparative example.
Figure 12:
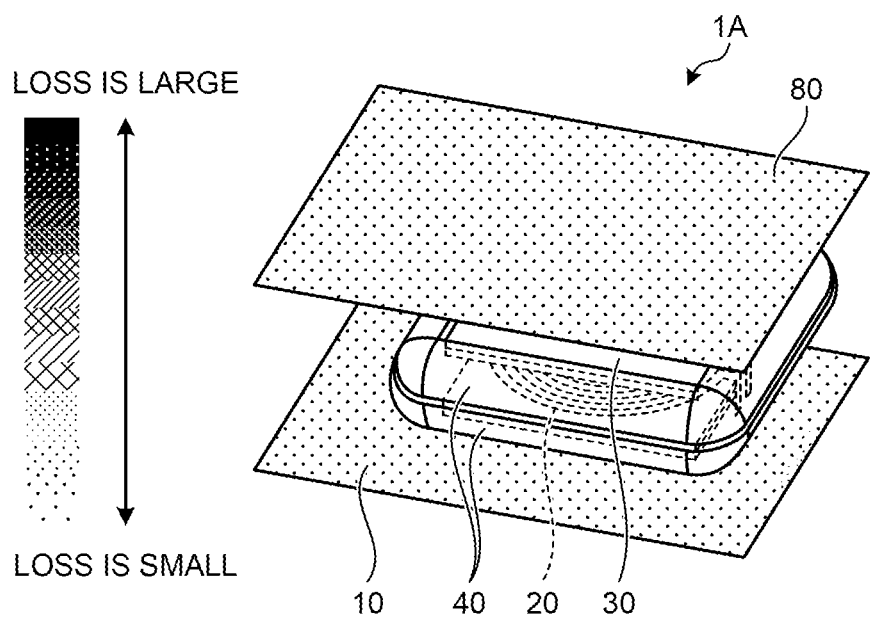
FIG. 12 is a diagram illustrating an eddy current loss in the power transmission unit in the second embodiment.
Figures 13, 14:
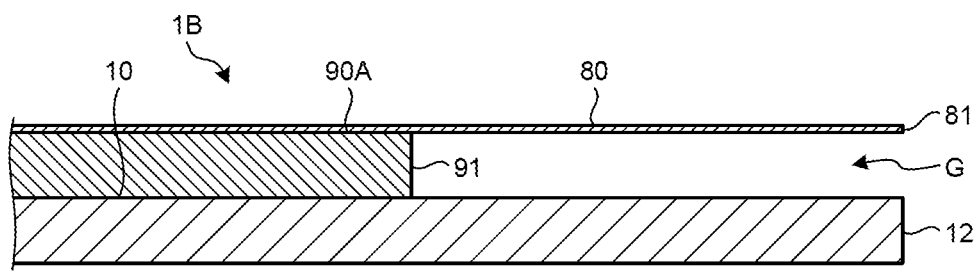
FIG. 13 is a diagram illustrating an example of a distance between a substrate and the power transmission coil in the second embodiment.
FIG. 14 is a cross-sectional view illustrating an exemplary structure of a major part of the power transmission unit in a third embodiment.

As described above, the power transmission unit 1A in the second embodiment includes the magnetic member 90 that is formed in a plate shape, provided between the substrate shielding member 80 and the substrate 10, and includes the magnetic material. The magnetic member 90 thus structured in the power transmission unit 1A allows magnetic force (a magnetic field) generated by a high frequency current flowing in the substrate 10 to pass through the magnetic member 90, thereby preventing the magnetic force from reaching the substrate shielding member 80. As illustrated in FIG. 10, the power transmission unit 1A thus can further reduce the substrate leakage magnetic field distributed outside the outer case 70 than that of the power transmission unit 1 (FIG. 8) in the first embodiment. The magnetic member 90 of the power transmission unit 1A can also prevent the occurrence of eddy current in the substrate shielding member 80. The power transmission unit 1 in the first embodiment has tendency that the substrate leakage magnetic field is distributed in the substrate shielding member 80 because the power transmission unit 1 does not include the magnetic member 90. The distribution of the substrate leakage magnetic field in the power transmission unit 1 in the first embodiment causes the eddy current to be generated in the substrate shielding member 80. As illustrated in FIG. 11, a loss due to the eddy current (eddy current loss) becomes relatively large. In contrast, the power transmission unit 1A including the magnetic member 90 in the second embodiment can prevent the substrate leakage magnetic field from being distributed in the substrate shielding member 80. The power transmission unit 1A in the second embodiment thus can prevent the occurrence of the eddy current in the substrate shielding member 80. As a result, as illustrated in FIG. 12, the power transmission unit 1A in the second embodiment can further reduce the loss due to the eddy current than that of the power transmission unit 1 in the first embodiment, thereby making it possible to increase the power transmission efficiency. FIG. 13 is a diagram illustrating an example of the distance between the substrate 10 and the power transmission coil 20 in the second embodiment. In FIG. 13, L represents an inductance, R represents a resistance value, Q represents a quality factor, and κ represents a coupling factor. As illustrated in FIG. 13, when the distance between the substrate 10 and the power transmission coil 20 is around 15 mm in the power transmission unit 1 in the first embodiment serving as a comparative example, the quality factor Q is smaller than that when the distance between the substrate 10 and the power transmission coil 20 is around 20 mm. This is because as the distance decreases, the substrate 10 and the power transmission coil 20 are located closer to each other, and the eddy current generated in the substrate shielding member 80 thus increases. The magnetic member 90 of the power transmission unit 1A in the second embodiment prevents the eddy current generated in the substrate shielding member 80, thereby making it possible to increase the inductance L and to reduce the resistance value R. As a result, the power transmission unit 1A in the second embodiment can prevent the reduction in the quality factor Q even when the distance between the substrate 10 and the power transmission coil 20 is around 15 mm. The power transmission unit 1A in the second embodiment thus can reduce the distance between the substrate 10 and the power transmission coil 20 besides the prevention of reduction in power transmission efficiency and heat generation in the substrate shielding member 80 due to the eddy current, thereby making it possible to prevent an increase in size of the unit. As illustrated in FIG. 13, losses in the wiring materials connecting the electronic components 11 on the substrate 10 and in the power transmission coil 20 are less changed.

Third Embodiment

The following describes a power transmission unit 1B and a power transmission unit 2B on the other side according to a third embodiment. The power transmission units 1B and 2B have the same structure. The description of the power transmission unit 2B on the other side is thus omitted. In the third embodiment, the constituent elements having the same structures as those in the first and the second embodiments have the same numerals as those in the first and the second embodiments. The detailed descriptions thereof are thus omitted. The power transmission unit 1B differs from the power transmission unit 1A in the second embodiment in that a size of a magnetic member 90A is smaller than that of the substrate shielding member 80. In the power transmission unit 1B, as illustrated in FIG. 14, the edge 91 on the extending direction side of the magnetic member 90A along the intersecting direction is located inside the edge 81 on the extending direction side of the substrate shielding member 80 along the intersecting direction. The edge 91 of the magnetic member 90A is located more on the central side, i.e., the axial line X side, of the substrate shielding member 80 than the edge 81 of the substrate shielding member 80. In other words, the edge 81 of the substrate shielding member 80 protrudes at a more outer side than the edge 91 of the magnetic member 90A. The magnetic member 90A of the power transmission unit 1B is formed such that the outer shape around the axial line X of the magnetic member 90A is smaller than that of the substrate shielding member 80. When viewed from the axial line direction, it is also described that the magnetic member 90A is located inside the substrate shielding member 80. This structure allows the power transmission unit 1B to form a gap G serving as an air layer provided between the substrate 10 and the substrate shielding member 80.

Figure 15:
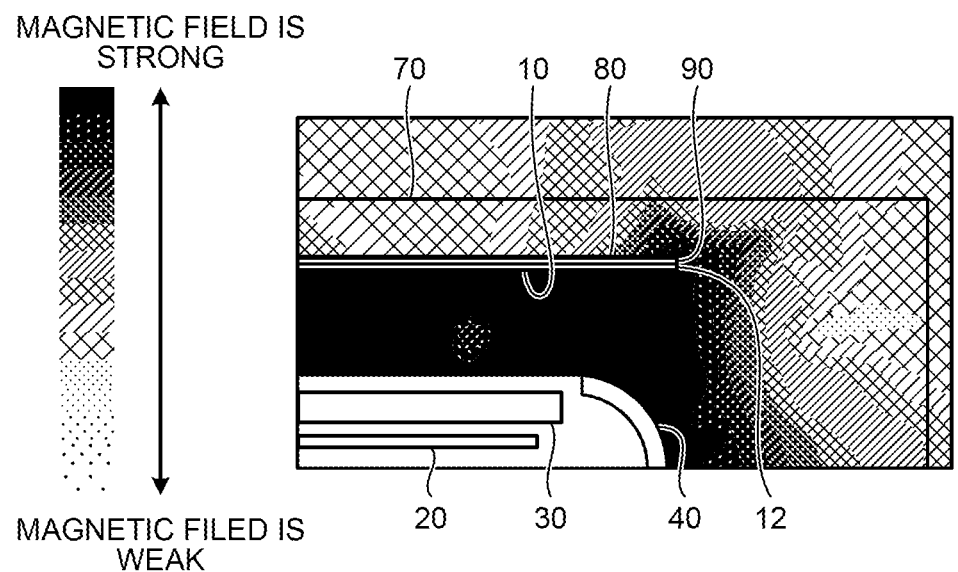
FIG. 15 is a diagram illustrating a magnetic field in the power transmission unit in the second embodiment serving as a comparative example.
Figure 16:
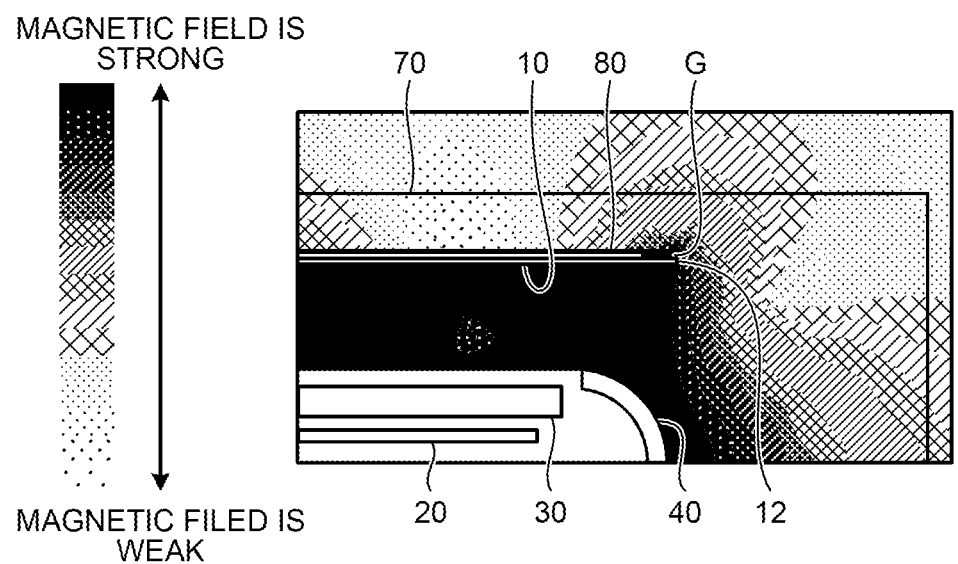
FIG. 16 is a diagram illustrating a magnetic field in the major part of the power transmission unit in the third embodiment.

As described above, in the power transmission unit 1B in the third embodiment, the edge 91 on the extending direction side of the magnetic member 90A along the intersecting direction intersecting the facing direction (axial line direction) in which the power transmission coil 20 and the substrate 10 face each other is located more on the central side of the substrate shielding member 80 than the edge 81 on the extending direction side of the substrate shielding member 80 along the intersecting direction. This structure allows the power transmission unit 1B to form the gap G between the substrate 10 and the substrate shielding member 80. In the power transmission unit 1B thus structured, the substrate leakage magnetic field passes magnetic member 90A more easily than the gap G at the edge 12 of the substrate 10. In the power transmission unit 1B, at the edge 12 of the substrate 10, the substrate leakage magnetic field is more easily distributed inside the edge 12 of the substrate 10. As illustrated in FIG. 15, the substrate leakage magnetic field is distributed outside the edge 12 of the substrate 10 relatively wide in the power transmission unit 1A in the second embodiment because the power transmission unit 1A is not provided with the gap G. In contrast, as illustrated in FIG. 16, the power transmission unit 1B in the third embodiment can further reduce the substrate leakage magnetic field distributed outside the edge 12 of the substrate 10 than that of the power transmission unit 1A in the second embodiment because the power transmission unit 1B is provided with the gap G.

The following describes results of simulation of the power transmission efficiencies of the power transmission unit 1 in the first embodiment, the power transmission unit 1A in the second embodiment, and the power transmission unit 1B in the third embodiment with reference to FIG. 17. In FIG. 17 and expressions (1) to (3), L represents the inductance, R represents the resistance value, Q represents the quality factor, κ represents the coupling factor, f represents a frequency of power in non-contact power supply, η represents the power transmission efficiency, and ηmaxSS represents a maximum power transmission efficiency. The quality factor Q is obtained by expression (1). The power transmission efficiency η is proportional to a product of the coupling factor κ and the quality factor Q as represented in expression (2). The maximum power transmission efficiency ηmaxSS is obtained by expression (3).

$$Q = 2\pi f \, L/R \qquad (1)$$

$$\eta \propto \kappa \cdot Q \qquad (2)$$

$$\eta_{maxSS} = \cfrac{1}{1 + \cfrac{2}{\kappa\sqrt{Q_1 Q_2}}} \qquad (3)$$

As illustrated in FIG. 17, the quality factor Q of the power transmission unit 1B in the third embodiment is the highest, the second highest is that of the power transmission unit 1A in the second embodiment, and the third highest is that of the power transmission unit 3 in the comparative example. The power transmission unit 1 in the first embodiment can further reduce the substrate leakage magnetic field than the power transmission unit 3 in the comparative example because the power transmission unit 1 includes the substrate shielding member 80. The quality factor Q of the power transmission unit 1 in the first embodiment is, however, lower than that of the power transmission unit 3 in the comparative example because the eddy current is generated in the substrate shielding member 80. The coupling factors κ slightly differ among the first, the second, and the third embodiments and the comparative example, but are the substantially the same value. The power transmission unit 1A in the second embodiment can more largely reduce the eddy current loss in the substrate shielding member 80 than the power transmission unit 1 in the first embodiment because the power transmission unit 1A includes the magnetic member 90. The power transmission unit 1B in the third embodiment can also more largely reduce the eddy current loss in the substrate shielding member 80 than the power transmission unit 1 in the first embodiment because the power transmission unit 1B includes the magnetic member 90A. The substrate leakage magnetic field at a place apart from the outer case 70 in the axial line direction by around 25 mm is the smallest in the power transmission unit 1B in the third embodiment, the second smallest is the power transmission unit 1A in the second embodiment, and the third smallest is the power transmission unit 1 in the first embodiment, while the largest is in the power transmission unit 3 in the comparative example. As described above, the power transmission unit 1 in the first embodiment, the power transmission unit 1A in the second embodiment, and the power transmission unit 1B in the third embodiment can further reduce the substrate leakage magnetic field than the power transmission unit 3 in the comparative example. The power transmission unit 1A in the second embodiment and the power transmission unit 1B in the third embodiment can further increase the quality factor Q than the power transmission unit 3 in the comparative example. The power transmission unit 1A in the second embodiment and the power transmission unit 1B in the third embodiment thus have high power transmission efficiency. The power transmission unit 1A in the second embodiment and the power transmission unit 1B in the third embodiment can reduce the number of turns in the power transmission coil 20, because the power transmission unit 1A in the second embodiment and the power transmission unit 1B in the third embodiment can further increase the quality factor Q than the power transmission unit 3 in the comparative example. As a result, the power transmission unit 1A and the power transmission unit 1B can be downsized.

Modifications

The following describes modifications of the first, the second, and the third embodiments. In the power transmission units 1, 1A, and 1B, a high frequency current flows in the substrate 10. A current flowing in the substrate 10 is not limited to the high frequency current. The embodiments may be applicable for a case where a low frequency current flows in the substrate 10.

In the embodiments, the substrate shielding member 80 is the metallic plate. The substrate shielding member 80 is not limited to the metallic plate. For example, the substrate shielding member 80 may be a metallic film layer. In this case, the substrate shielding member 80 is formed in a film shape on the rear surface 10b of the substrate 10 or on the magnetic member 90 by vapor deposition of metal, for example.

In the embodiments, the substrate shielding member 80 is formed to have the same size as the substrate 10. The size of the substrate shielding member 80 is not limited to the example. The substrate shielding member 80 may be larger or smaller than the substrate 10 in size. When the substrate shielding member 80 is smaller than the substrate 10 in size, the substrate shielding member 80 may cover an area where a high frequency current flows in the substrate 10.

The respective coupling members 64 included in the inner case 60 may function as a spacer. The spacer adjusts the distance between the substrate 10 and both of the power transmission coil 20 and the communication coupler 50 that are provided on the inner case 60, thereby preventing interference between the substrate 10 and both of the power transmission coil 20 and the communication coupler 50.

The power transmission unit according to the embodiment includes the first shielding member that is provided on the side opposite to the side adjacent to the power transmission coil of the substrate and shields a magnetic field, thereby making it possible to reduce external leakage of a magnetic field generated from at least the substrate.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A power transmission unit, comprising:
   a power transmission coil that transmits power to a counterpart power transmission coil in a non-contact manner;
   a substrate that is formed in a plate shape, provided such that the substrate faces the power transmission coil, and electrically coupled to the power transmission coil, a current flowing between the substrate and the power transmission coil;
   a first shielding member that is formed in a plate or a film shape, provided on a side opposite to a side adjacent to the power transmission coil of the substrate, and shields a magnetic field; and
   a magnetic member that is formed in a plate shape, provided between the first shielding member and the substrate, and includes a magnetic material,
   wherein an edge on an extending direction side of the magnetic member along an intersecting direction intersecting a facing direction in which the power transmission coil and the substrate face each other is located more on a central side of the first shielding member than an edge on an extending direction side of the first shielding member along the intersecting direction.

2. The power transmission unit according to claim 1, wherein
   the first shielding member is formed to have the same size as the substrate.

3. The power transmission unit according to claim 2, further comprising:
   a second shielding member that is formed in an annular shape around an axial line and has a shield wall shielding a magnetic field generated by the power transmission coil provided inside the second shielding member, wherein
   the shield wall is formed such that a distance between wall surfaces facing each other in an intersecting direction intersecting the axial line increases toward the counterpart power transmission coil.

4. A power transmission unit, comprising:
   a power transmission coil that transmits power to a counterpart power transmission coil in a non-contact manner;
   a substrate that is formed in a plate shape, provided such that the substrate faces the power transmission coil, and electrically coupled to the power transmission coil, a current flowing between the substrate and the power transmission coil;
   a first shielding member that is formed in a plate or a film shape, provided on a side opposite to a side adjacent to the power transmission coil of the substrate, and shields a magnetic field; and
   a second shielding member that is formed in an annular shape around an axial line and has a shield wall shielding a magnetic field generated by the power transmission coil provided inside the second shielding member, wherein
   the shield wall is formed such that a distance between wall surfaces facing each other in an intersecting direction intersecting the axial line increases toward the counterpart power transmission coil.

* * * * *